(12) United States Patent
Ikuta

(10) Patent No.: US 6,386,809 B2
(45) Date of Patent: May 14, 2002

(54) NUT ASSEMBLY WITH PIVOTABLE NUT

(75) Inventor: Kazuichi Ikuta, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/748,159

(22) Filed: Dec. 27, 2000

(30) Foreign Application Priority Data

Jan. 28, 2000 (JP) .......................................... 2000-20425
Jun. 9, 2000 (JP) ....................................... 2000-173882

(51) Int. Cl.[7] ............................ F16B 21/00; F16B 27/00
(52) U.S. Cl. .......................... 411/340; 411/85; 411/344
(58) Field of Search ............................. 411/84, 85, 340, 411/344, 345, 346

(56) References Cited

U.S. PATENT DOCUMENTS 5,067,864 A * 11/1991 Dewey et al. .............. 411/344
5,322,401 A * 6/1994 Vernet et al. ............... 411/344
6,226,952 B1 * 5/2001 Guardia .................. 411/345 X

* cited by examiner

Primary Examiner—Neill Wilson
(74) Attorney, Agent, or Firm—Wenderoth, Lind & Ponack, L.L.P.

(57) ABSTRACT

A nut assembly is provided which has a pivotable nut having both sides thereof increased in wall thickness to impart strength and thereby to prevent breakage of the nut upon tightening of a bolt. The nut assembly includes a nut having pivot pins about which the nut is pivotable, and a frame having a flange formed with a bolt hole and a pair of arms provided on both sides of the flange. A pair of hanging walls extending in the bolt inserting direction are provided around the bolt hole at two opposing positions on an imaginary plane perpendicular to a line connecting the pins. This makes it possible to narrow the width of the guide hole of the nut in which the hanging walls are received by an amount by which the banging walls have narrowed. By this arrangement, the wall thickness of both sides of the nut is increased.

7 Claims, 6 Drawing Sheets

NUT ASSEMBLY WITH PIVOTABLE NUT

BACKGROUND OF THE INVENTION

This invention relates to a nut assembly used to secure an instrument by use of a bolt to a structure, the back of which is not accessible.

A conventional nut assembly 1 of this type is shown in FIGS. 8A–11. It comprises a frame 9 having a flange 7 formed with a bolt hole 6, two elongated flat arms 8 extending parallel to each other in one direction from both sides of the flange 7 and each formed with elongated holes 10, and a nut 5 substantially in the shape of a rectangular pole having four longitudinal sides.

A pair of pins 3 protrude laterally from a pair of opposed longitudinal sides of the nut 5 and are loosely received in the elongated holes 10 of the arms 8 so that the nut 5 is pivotable about the pins 3 relative to the arms 8. The arms have lugs 12 at their distal ends. The nut 5 has lugs 11 adapted to abut the lugs 12 when the nut 5 longitudinally aligns with the arms 8 to prevent the nut 5 from turning in one direction from this position while allowing it to turn only in the opposite direction from this position by 90°. Further, the lugs 11 and 12 are arranged such that the nut 5 is slidable in the holes 10 only while the nut 5 is positioned perpendicular to the arms 8.

The nut 5 is formed with a threaded hole 2 extending therethrough from one of the second pair of opposed longitudinal sides to the other. The nut 5 is further formed with an inclined guide surface 4 arranged such that when a bolt A is inserted through the bolt hole 6 with the lugs 11 and 12 in abutment with each other, the bolt slides along the guide surface 4 while pivoting the nut 5 in the opposite direction until the nut becomes perpendicular to the axis of the arms 8 and its threaded hole 2 aligns with the bolt hole 6.

The flange 7 of the frame 9 is substantially rectangular and is formed with a cylindrical apron wall 13 (FIG. 8B) extending in the same direction as the arms 8 from the edge of the bolt hole 6 to guide the bolt A toward the threaded hole 2 of the nut 5.

In order to guide the bolt axially toward the threaded hole 2, the cylindrical apron wall 13 has an inner diameter slightly greater than the major diameter of the bolt At one end of the threaded hole 2 where the guide surface 4 is formed, an inverted conical guide hole 14 is formed coaxially and communicating with the threaded hole 2 to guide the bolt smoothly into the threaded hole.

FIGS. 9 and 10 show how this nut assembly is used to secure an article C to a board B whose back is inaccessible. First a starting hole D is formed in the board B with such a size that with the lugs 11 and 12 in abutment with each other, the nut 5 and the arms 8 can pass therethrough but the flange 7 cannot The nut assembly is inserted into the hole D with the lugs 11 and 12 in abutment with each other until the flange 7 abuts the edge of the hole D. Then, with an article C to be fastened to the board B pressed against the flange 7, a bolt A is inserted through a hole E of the article C and the hole D of the board B and slid along the guide surface 4 until the nut 5 pivots about the pins 3 and becomes perpendicular to the axis of the arms 8.

In this state, the threaded hole 2 of the nut 5 aligns with the bolt hole 6. Thus, as the bolt A is turned by a screwdriver in this state, it threads into the threaded hole 2 while pulling the nut 5 toward the flange 7 until the nut 5 is pressed against the back of the board B as shown in FIG. 9. The article C is now fastened to the board B.

In the example shown, the board B is fairly thick, so that the apron wall 13 is not received in the guide hole 14. But if the board B is thinner, the former will be received in the latter. Thus, the diameter of the guide hole 14 at its top has to be at least slightly greater than the outer diameter of the apron wall 13, that is, it has to be at least slightly greater than the sum of the major diameter of the bolt A and twice the thickness of the wall 13. Thus, the maximum diameter of the guide hole 14 at its top is substantially greater than the major diameter of the bolt A. On the other hand, in order to minimize the diameter of the starting hole D, the thickness and width of the nut 5 have to be as small as possible. Thus, the portions of the nut between the side edges of the nut and the side edges of the guide hole 14 are small in width T1 as shown in FIG. 8A. Since these portions are narrow, the nut tends to bend or buckle at these portions as shown in FIG. 11 when the bolt is tightened. Once the nut bends or buckles, it is impossible to tighten the bolt any further.

In order to accurately guide the bolt toward the threaded hole 2, the apron wall 13 has to be sufficiently long in the longitudinal direction. But it was technically difficult to form a long cylindrical wall by pressing the flange 7. Thus, the conventional apron wall 13 was too short to guide the bolt An object of the invention is to provide a nut assembly having a pivotable nut that is less likely to be bent, buckled or otherwise damaged and capable of guiding a bolt accurately.

SUMMARY OF THE INVENTION

According to the invention, there is provided a nut assembly with a pivotable nut comprising a nut having a threaded through-hole and a pin on each side thereof, and a frame having a flange formed with a bolt hole and a pair of arms provided on both sides thereof so as to extend in one direction, the arms each being formed with an elongated hole, the nut being formed at one end thereof with an inclined guide surface for pivoting the nut when pushed by a bolt, the nut being pivotally and slidably mounted between the arms with the pins received in the elongated holes in the arms, characterized in that a pair of hanging walls extending in a direction in which a bolt is inserted are provided around the bolt hole at two portions so as to oppose each other in an imaginary plane perpendicular to a line connecting the pins on the nut The hanging walls may have the distance between them decreasing gradually toward their tips.

The hanging walls may have their circumferential ends terminating at positions inside of edges of the arms.

DETAILED DESCRIPTION OF THE PREFERRED EMBODIMENT

Figure 1:
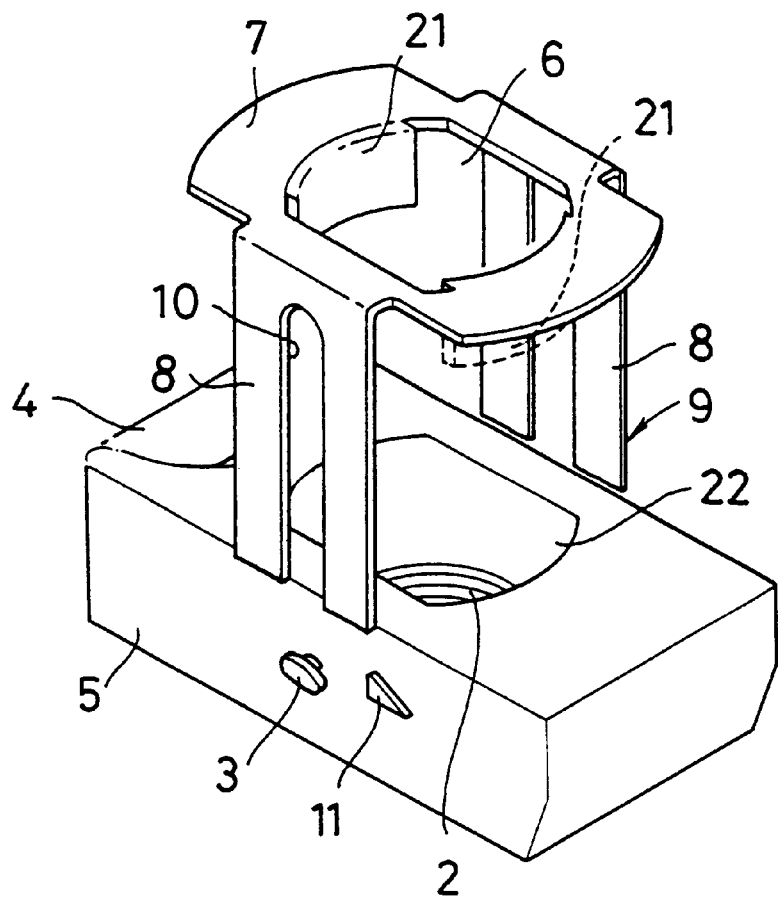
FIG. 1 is a perspective view of a nut assembly embodying this invention.

FIG. 1 shows a nut assembly embodying the present invention. It has basicallythe same structure as the conventional nut assembly shown in FIGS. 8–11. Thus, like parts are denoted by like numerals and their description is omitted.

As shown in FIG. 1, the nut assembly according to this invention has a frame 9 and a pivotable nut 5. The frame 9 has a flange 7 formed with a bolt hole 6, and two elongated flat arms 8 extending parallel to each other in one direction from both sides of the flange 7 and each formed with an elongated hole 10. A pair of pins 3 protrude laterally from a pair of opposed longitudinal sides of the nut 5 and are loosely received in the elongated holes 10 of the arms 8 so that the nut 5 is pivotable about the pins 3 relative to the arms 8.

The frame 9 is provided around the bolt hole 6 with an opposed pair of hanging walls 21 extending in the direction in which a bolt advances, at two positions so as to oppose each other in an imaginary plane perpendicular to a line connecting the pins 3 on the nut 5.

The hanging walls 21 serve to guide straight movement of a bolt A inserted into the bolt hole 6. They are formed into an arcuate shape and are spaced apart by a distance sufficient for the bolt to pass therebetween. Even though the hanging walls 21 are divided into two portions, they can guide the bolt properly in an axial straight line. By dividing them into two portions so as to oppose each other in an imaginary plane perpendicular to the line connecting the pins 3, the gaps between the separated portions are disposed near the arms 8 on both sides of the frame 9.

Figure 2:
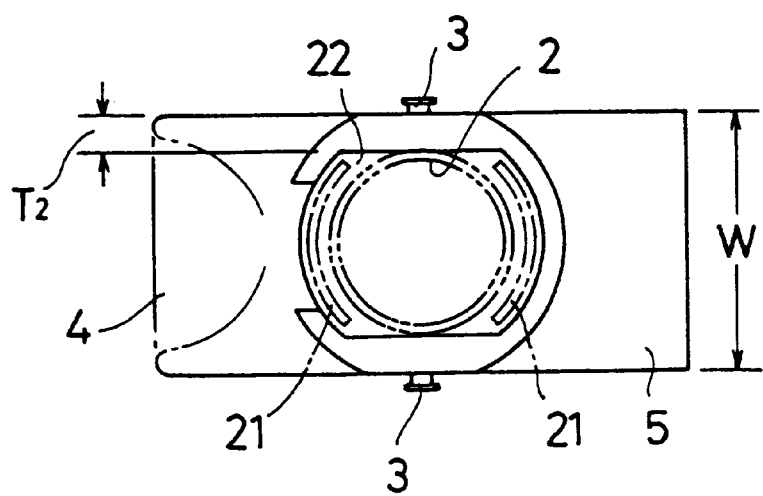
FIG. 2 is a plan view of the same.
Figure 3:
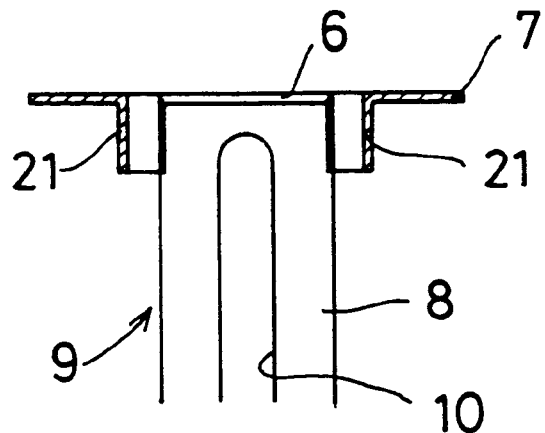
FIG. 3 is a vertical sectional view of the frame of the same.

By providing the hanging walls 21 so as to be divided into two portions, their circumferential width can be set to be narrow so as to be within a guide hole 22 of the nut 5 as shown in FIG. 2.

The guide hole 22 formed in the nut 5 has its introducing portion wider than the diameter of the threaded hole 2 and serves to guide the bolt A into the threaded hole. The guide hole 22 has its width in the width direction of the nut 5 set to such a width that the hanging walls 21 are received. Specifically, the width of the guide hole 22 may be set to a width approximate to the outer diameter of the bolt such that the bolt can pass therethrough.

By setting the width of the guide hole 22 along the width direction of the nut 5 to a width approximate to the diameter of the bolt A, the wall thickness T2 (FIG. 2) between the guide hole 22 of the nut and both sides thereof can be thick. This makes it possible to effectively use this portion that remains after the diameter of the bolt A has been reduced from the width W of the nut 5. Thus, it can be set about 50% thicker than the wall thickness T1 between the guide hole 14 of the conventional nut 5 shown in FIG. 8 and each of its two sides. This markedly improves the strength at both side portions of the nut The hanging walls 21 provided separately at two opposed positions of the flange 7 of the frame 9 are independent walls having a circumferential width that is about 40°% or less of the circumference of an imaginary circle including the arcuately formed hanging walls 21. Thus it is possible to use most of the material of the portion of the bolt hole 6 formed in the flange 7 as the material forming the hanging walls 21. Thus, it is possible to form the hanging walls 21 having a height with a length approximate to ½ of the diameter of the bolt hole 6, thus providing a sufficient bolt guiding performance.

Figure 4:
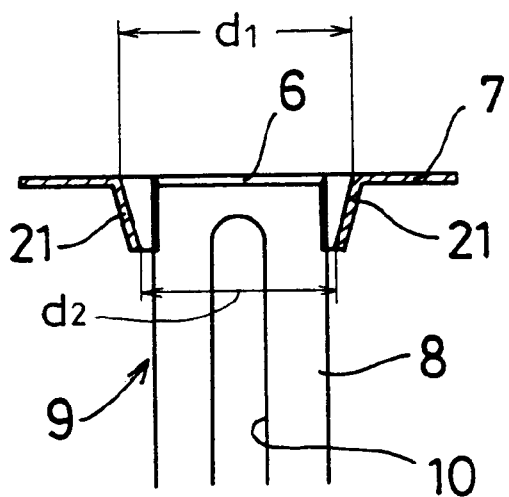
FIG. 4 is a similar view of another example of the frame.

Also, as shown in FIG. 4, the hanging walls 21 may be formed so that the distance between the opposing surfaces will gradually decrease toward their tips. Resilience may also be imparted to the hanging walls 21.

By setting the distance between the opposing surfaces of the hanging walls 21 such that the width d2 at the tip portion relative to the width d1 of the opening will satisfy the relation d1>d2, the bolt can be inserted easily toward the guide hole 22 of the nut 5.

Since the hanging walls 21 are independent walls, it is possible to impart resilience, so that even a bolt thicker than the width d2 can be guided to the center.

Figure 5:
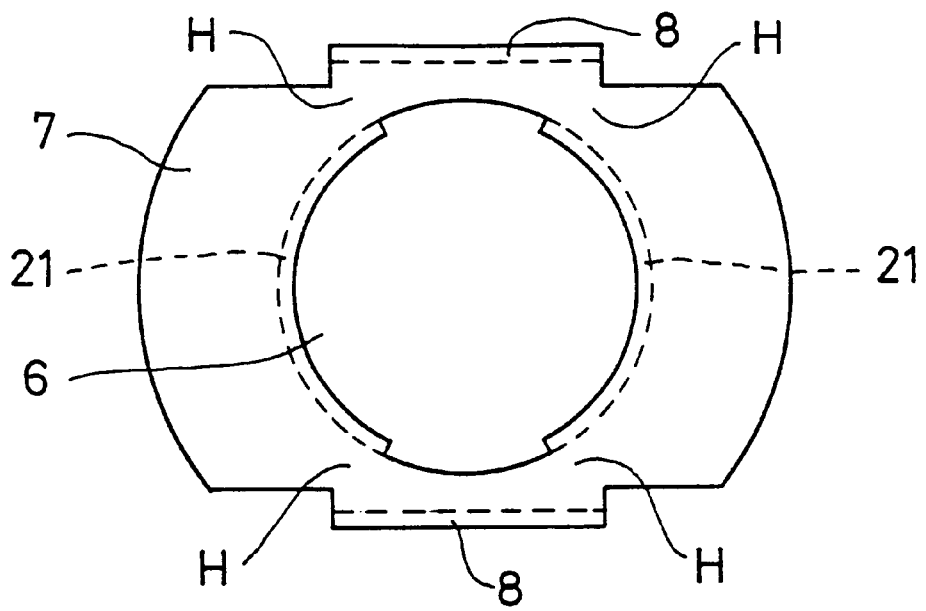
FIG. 5 is a plan view showing the position of the hanging walls.

FIG. 5 shows an embodiment in which the hanging walls 21 have their ends terminated at positions inside of the edges of the opposing arms 8 to improve the bending resistance of the flange 7.

Figure 6:
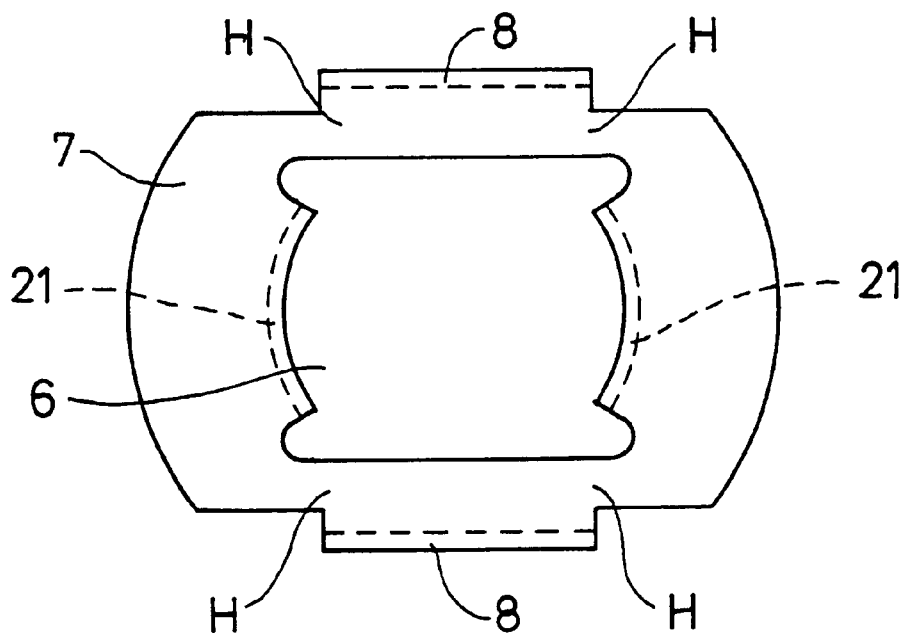
FIG. 6 is a plan view showing another example of the hanging walls.
Figure 7:
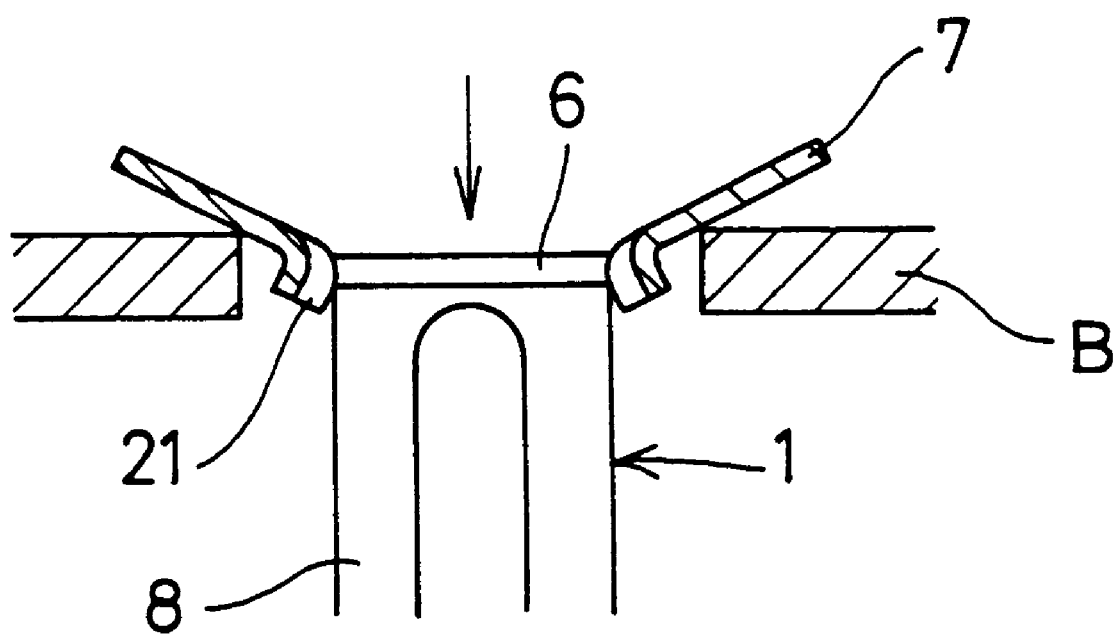
FIG. 7 is a vertical sectional view showing how the flange of the frame is bent.
Figure 8A:
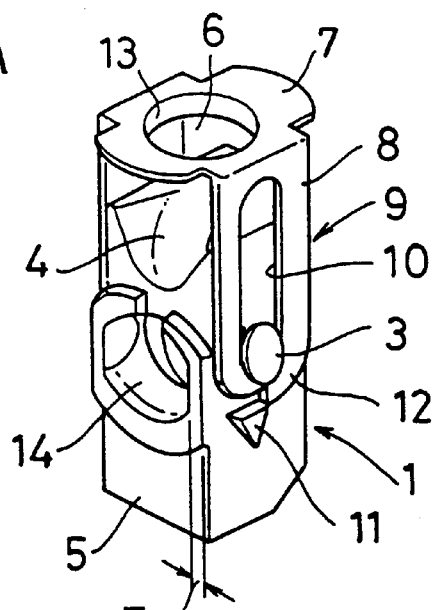
FIG. 8A is a cross-sectional bottom view of the same.
Figure 8B:
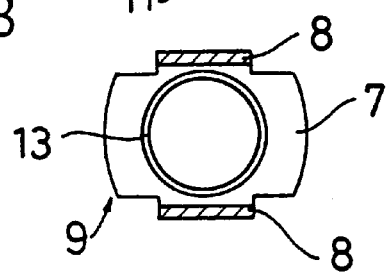
FIG. 8 is a perspective view of a prior art nut assembly.
Figure 9:
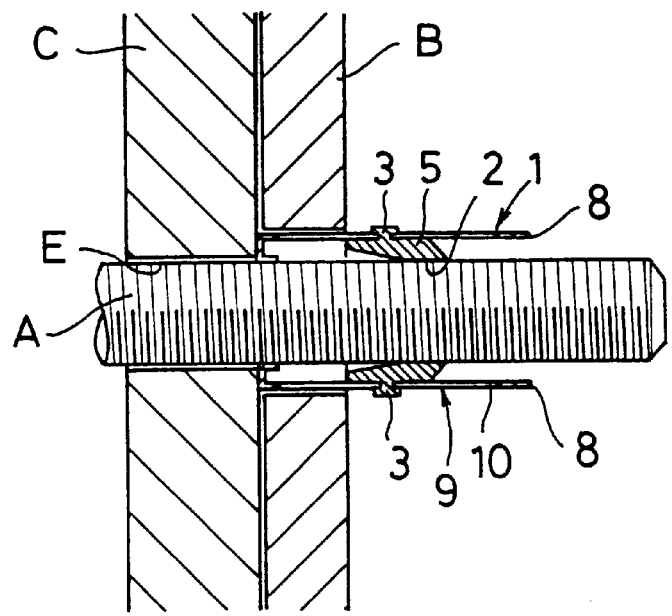
FIG. 9 is a sectional view showing how an article is secured with the prior art nut assembly.
Figure 10:
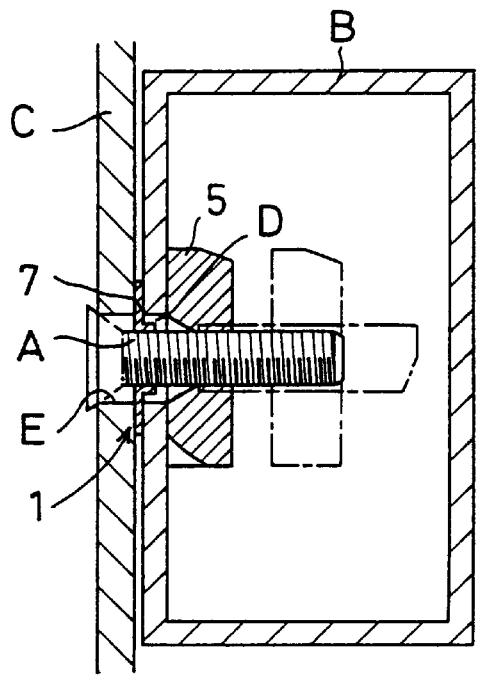
FIG. 10 is a similar view showing the article tightened completely.

FIG. 6 shows another arrangement in which the circumferential ends of the hanging walls 21 terminate at positions outside of the edges of the opposing arms 8. With this arrangement, the distances H between the inner periphery of the bolt hole 6 and the side edges of the arms 8 are narrow, so that during use, as shown in FIG. 7, when the nut is pushed hard and turned by tightening a bolt, at the narrowest portions between the bolt hole 6 of the flange 7 and its outer periphery, it may be bent By terminating the circumferential ends of the hanging walls 21 at positions inside of the edges of the opposing arms 8, the portions where the distance H between the inner periphery of the bolt hole 6 and the side edges of the arms 8 is the narrowest are reinforced, so that the bending resistance at the narrow portions improves. Thus it is possible to effectively prevent bending of the flange 7.

Since the hanging walls 21 extending in the direction in which a bolt is inserted are provided separately at two opposing positions in an imaginary plane perpendicular to the line connecting the pins 3, it is possible to make the circumferential width of the hanging walls 21 narrower. Thus, it is possible to narrow the width of the guide hole 22 of the nut 5 in which the hanging walls 21 are received by an amount by which the banging walls have narrowed.

Figure 11:
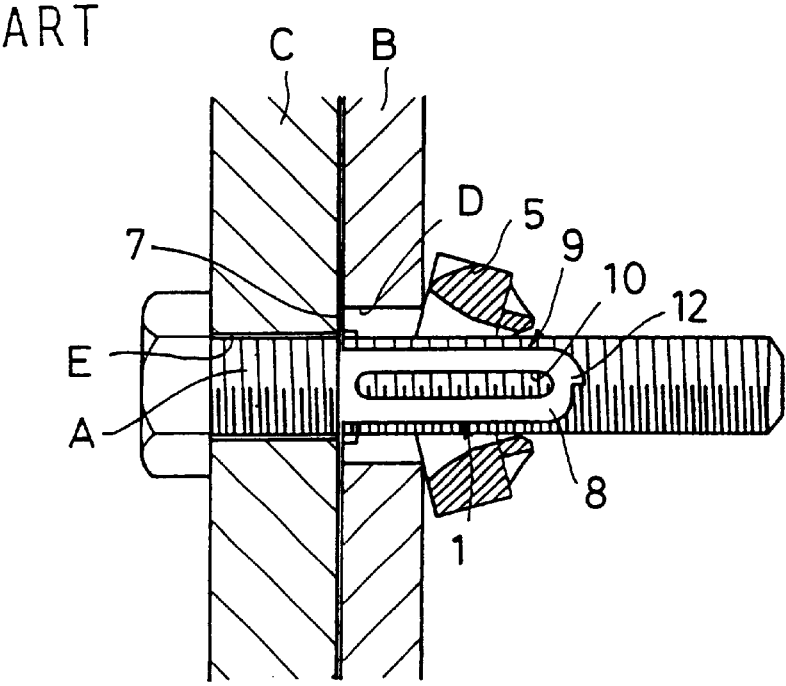
FIG. 11 is a sectional view showing how the nut is broken with the prior art nut assembly.

By this arrangement, it is possible to increase the wall thickness between the inner periphery of the guide hole 22 of the nut 5 and both sides thereof. Thus the strength at both side portions of the nut 5 improves, so that even if the bolt tightening force is large, the nut 5 would not break as shown in FIG. 11. Thus, an instrument C can be securely fixed to a member B.

What is claimed is:

1. A nut assembly comprising a nut having a threaded through-hole and a pin on each side thereof, and a frame having a flange formed with a bolt hole and a pair of arms provided on both sides thereof so as to extend in one direction, said arms each being formed with an elongated hole, said nut being formed at one end thereof with an inclined guide surface for pivoting said nut when pushed by a bolt, said nut being pivotally and slidably mounted between said arms with said pins received in said elongated holes in said arms, characterized in that a pair of hanging walls extending in a direction in which a bolt is to be inserted are provided around said bolt hole at two positions so as to oppose each other in an imaginary plane perpendicular to a line connecting said pins on said nut.

2. The nut assembly as claimed in claim 1 wherein said hanging walls have the distance between their opposing surfaces gradually narrowing toward their tips.

3. The nut assembly as claimed in claim 2 wherein said hanging walls have resilience.

4. The nut assembly as claimed in claim 2 wherein said hanging walls have their circumferential ends terminating at positions inside of edges of said arms.

5. The nut assembly as claimed in claim 1 wherein said hanging walls have resilience.

6. The nut assembly as claimed in claim 3 wherein said hanging walls have their circumferential ends terminating at positions inside of edges of said arms.

7. The nut assembly as claimed in claim 1 wherein said hanging walls have their circumferential ends terminating at positions inside of edges of said arms.

* * * * *